UNITED STATES PATENT OFFICE.

WILLIAM NEHRING, OF CINCINNATI, OHIO, ASSIGNOR TO THE QUEEN CITY MALLEABLE IRON COMPANY, OF SAME PLACE.

FURNACE-LINING AND BRICKS THEREFOR.

SPECIFICATION forming part of Letters Patent No. 253,748, dated February 14, 1882.

Application filed December 29, 1881. (No specimens.)

*To all whom it may concern:*

Be it known that I, WILLIAM NEHRING, of Cincinnati, Hamilton county, Ohio, have invented a new and useful Improvement in Furnace-Linings and Bricks Therefor, of which the following is a specification.

It is well known that smelting and other furnaces subjected to intense heat are liable to constant deterioration, necessitating frequent renewal, involving heavy loss in time and fuel, it being necessary, in order to enable their repair, to blow out, cool down, allow time for the newly-applied lining to become set, and then further time for the furnace to reach the effective temperature. Serious as this loss is, a still greater one often arises in the continued use of the furnace after it has lost its proper shape. So-called "fire-proof" clays and mortars are the main materials used for repairing such damaged furnace-walls. These are, as a rule, so poor that they fail to stand one heat, and becoming loosened, mingle with and render impure the iron or other material undergoing treatment. Such material is of great disadvantage not only to the furnace itself, but also to the metal or other substance being operated upon.

In the course of many years' experience in iron industries, and after numerous experiments, I have succeeded in producing an economical mortar of a very high and enduring refractoriness. The composition of this mortar is (by weight) as follows: forty-five parts rubbish of old used fire-brick; twenty-five parts pieces of old crucibles; twenty parts blue clay; nine parts graphite. Two-thirds of this mixture are ground to assume the form of coarse sand, and the remaining third is finely pulverized. A separate mixture, composed of one part green vitriol, (iron sulphate,) one part potash-alum, is also finely pulverized and well mixed with the first named.

For repairing purposes this fire-proof mortar is mixed with water until it assumes the consistency of dough.

Bricks made of this material and dried in the air under shelter (not burned) make excellent lining for cupolas and smelting-furnaces, and other furnaces which are subjected to intense heat, such as crucible-furnaces, blast-furnaces, puddling and refining furnaces, Siemens-Martin furnaces, smoke-consuming furnaces, &c.

I claim as new and of my invention—

1. A fire-proof lining-mortar for furnace walls and arches, consisting of the rubbish of old used fire-brick, fragments of old crucibles, blue clay, graphite, green vitriol, and potash-alum compounded in the manner and proportions substantially as set forth.

2. A fire-brick consisting of the rubbish of old used fire-brick, fragments of old crucibles, blue clay, graphite, green vitriol, and potash-alum compounded in the manner and proportions substantially as described, and air-dried, as set forth.

In testimony of which invention I hereunto set my hand.

WILLIAM NEHRING.

Attest:
GEO. H. KNIGHT,
SAML. S. CARPENTER.